United States Patent
Lee

(10) Patent No.: US 9,086,869 B2
(45) Date of Patent: Jul. 21, 2015

(54) PROCESSING SYSTEM AND POWER CONTROL DEVICE THEREOF

(75) Inventor: Jing-Ying Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 604 days.

(21) Appl. No.: 13/415,637

(22) Filed: Mar. 8, 2012

(65) Prior Publication Data
US 2013/0113532 A1    May 9, 2013

(30) Foreign Application Priority Data
Nov. 4, 2011    (TW) .............................. 100140244 A

(51) Int. Cl.
*G06F 1/30* (2006.01)
*G06F 1/24* (2006.01)

(52) U.S. Cl.
CPC ... *G06F 1/30* (2013.01); *G06F 1/24* (2013.01)

(58) Field of Classification Search
CPC ..................................... G06F 1/30; G06F 1/24
USPC .................. 307/112, 125; 713/300
See application file for complete search history.

(56) References Cited

U.S. PATENT DOCUMENTS

| | | | | |
|---|---|---|---|---|
| 5,715,465 | A * | 2/1998 | Savage et al. ................. | 713/340 |
| 7,257,720 | B2 * | 8/2007 | Ichien et al. ................... | 713/300 |
| 8,045,351 | B2 * | 10/2011 | Hsueh et al. .................... | 363/95 |
| 8,447,966 | B2 | 5/2013 | Yen et al. | |
| 2004/0103328 | A1 * | 5/2004 | Ichien et al. .................. | 713/300 |
| 2006/0253718 | A1 * | 11/2006 | Kawase et al. ................. | 713/300 |
| 2009/0196083 | A1 * | 8/2009 | Norman ......................... | 365/51 |
| 2010/0332815 | A1 * | 12/2010 | Yen et al. ......................... | 713/2 |
| 2011/0246700 | A1 * | 10/2011 | Norman ........................ | 711/102 |

FOREIGN PATENT DOCUMENTS

TW    201101184    1/2011

OTHER PUBLICATIONS

Taiwanese language office action dated Feb. 17, 2014.
English language translation of relevant paragraphs of office action.

* cited by examiner

*Primary Examiner* — Jared Fureman
*Assistant Examiner* — Emmanuel R Dominique
(74) *Attorney, Agent, or Firm* — McClure, Qualey & Rodack, LLP

(57) ABSTRACT

A power control device is provided. The power control device includes a power supply unit, a reset unit, and a power control unit. The power supply unit determines whether a supplied voltage from an external voltage supply source is being provided to the power supply unit to generate a determination signal. The power supply unit further generates an operation voltage and a standby voltage according to the supplied voltage. The reset unit receives the determination signal and the standby voltage and generates a reset signal according to the determination signal and the standby voltage to activate a reset operation. The power control unit receives the reset signal and generates a power enabling signal according to the reset signal. The power supply unit outputs the operation voltage or does not according to the power enabling signal.

14 Claims, 4 Drawing Sheets

PROCESSING SYSTEM AND POWER CONTROL DEVICE THEREOF

CROSS REFERENCE TO RELATED APPLICATIONS

This Application claims priority of Taiwan Patent Application No. 100140244, filed on Nov. 4, 2011, the entirety of which is incorporated by reference herein.

BACKGROUND OF THE INVENTION

1. Field of the Invention

The invention relates to a processing system, and more particularly to a power control device of a processing system.

2. Description of the Related Art

In general, an electronic system is coupled to an external AC power source. A power management unit in the electronic system converts an AC voltage provided by the external AC power source to operation voltages required for units in the electronic system. During a test process before an electronic system leaves the factory or during usage of the electronic system after it leaves the factory, power provided by an external power source coupled to the electronic system could be not stable. The unstable power may cause the electronic system to be at an unknown state and crash. In detail, when an external AC power source stops providing an AC voltage to an electronic system, a processing unit of the electronic system stores system state data (including system parameters, power information etc.) into a memory and then performs a reset operation. After, the processing unit notifies a power management unit to stop providing an operation voltage to the processing unit. When the external AC power source starts providing the AC voltage again before the processing unit finishes the data storage or the reset operation, the power management unit can not re-provide the operation voltage, so that the electronic system can not recovery to a normal operation mode. Then, the electronic system is at an unknown state and crashes.

BRIEF SUMMARY OF THE INVENTION

An exemplary embodiment of a power control device is provided. The power control device includes a power supply unit, a reset unit, and a power control unit. The power supply unit determines whether a supplied voltage from an external voltage supply source is being provided to the power supply unit to generate a determination signal. The power supply unit further generates an operation voltage and a standby voltage according to the supplied voltage. The reset unit receives the determination signal and the standby voltage and generates a reset signal according to the determination signal and the standby voltage to activate a reset operation. The power control unit receives the reset signal and generates a power enabling signal according to the reset signal. The power supply unit outputs the operation voltage or does not according to the power enabling signal.

In an embodiment, when the power supply unit determines that the supplied voltage is not being provided to the power supply unit, the power supply unit switches the determination signal to a disabled state from an enabled state at a time point. According to the determination signal with the disabled state and the standby voltage, the reset unit switches the reset signal to an enabled state from a disabled state at a second time point, which is later than the first time point, to activate the reset operation.

An exemplary embodiment of a processing system is provided. The processing system includes a processing unit, a power supply unit, a reset unit, and a power control unit. The processing unit performs a signal processing operation. The power supply unit determines whether a supplied voltage from an external voltage supply source is being provided to the power supply unit to generate a determination signal. The power supply unit further generates an operation voltage and a standby voltage according to the supplied voltage. The reset unit receives the determination signal and the standby voltage and generates a reset signal according to the determination signal and the standby voltage to control the processing unit to perform a reset operation. The power control unit receives the reset signal and generates a power enabling signal according to the reset signal. The power supply unit outputs the operation voltage to the processing unit or does not according to the power enabling signal.

In an embodiment, when the power supply unit determines that the supplied voltage is not being provided to the power supply unit, the power supply unit switches the determination signal to a disabled state from an enabled state at a time point. According to the determination signal with the disabled state and the standby voltage, the reset unit switches the reset signal to an enabled state from a disabled state at a second time point, which is later than the first time point, to control the processing unit to perform the reset operation.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
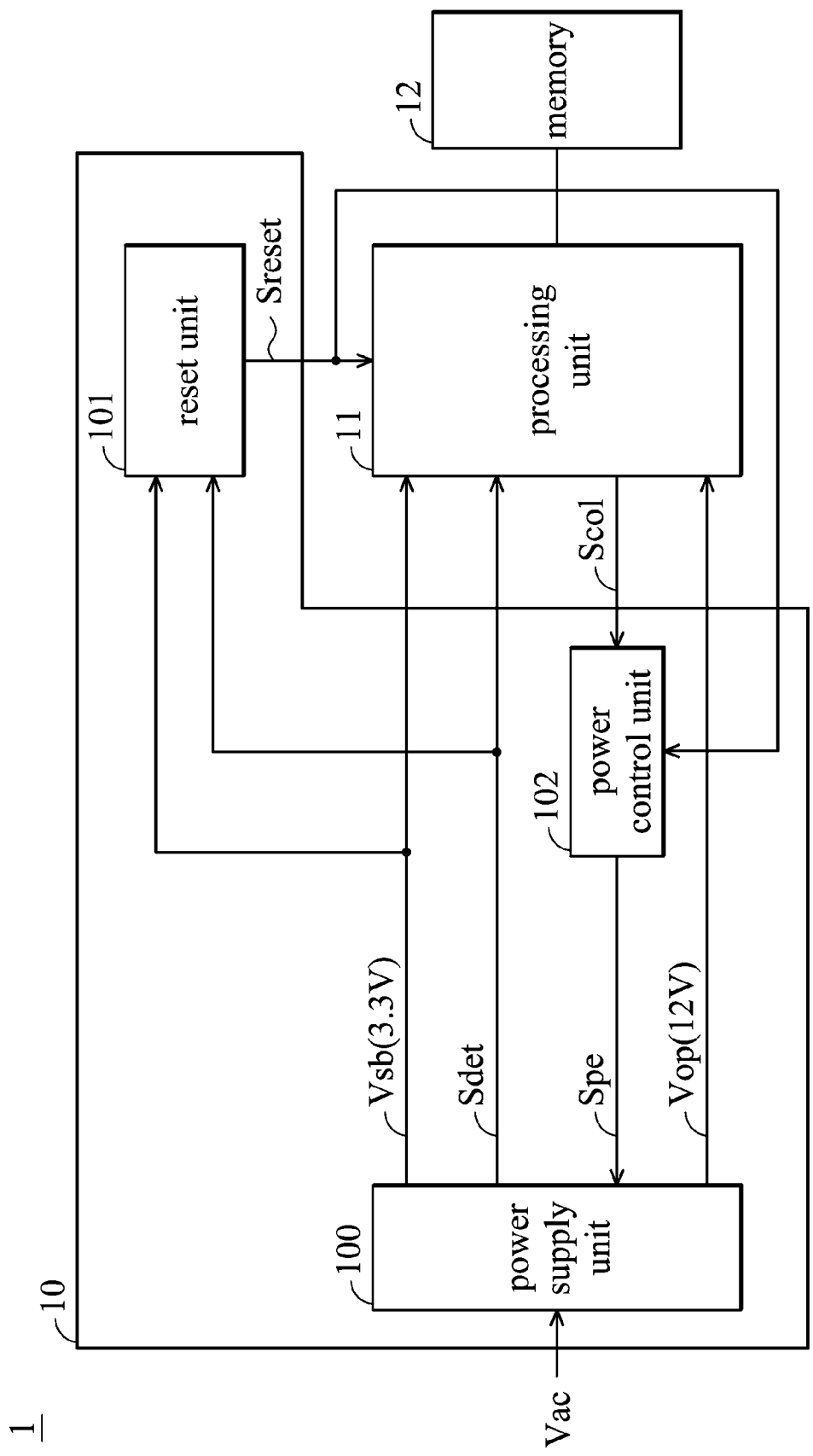
FIG. 1 shows an exemplary embodiment of a processing system.

Referring to FIG. 1, an exemplary embodiment of a processing system according to the present invention is shown. The processing system 1 includes a power control device 10, a processing unit 11, and a memory 12. The power control device 10 includes a power supply unit 100, a reset unit 101, and a power control unit 102. The power supply unit 100 is disposed on a power circuit board. When the power control device 10 is coupled to an external voltage supply source AC and the external voltage supply source AC normally provides a supplied voltage Vac (for example, the value of the supplied voltage Vac is equal to 220 ACV), the power supply unit 100 receives the supplied voltage Vac. The power supply unit 100 performs a buck operation to the supplied voltage Vac to generate a number of voltages (for example, comprising a voltage with a value approximately equal to 3.3V and a voltage with a value approximately equal to 12V). The number of voltages are provided to various units in the processing system 1 to serve as operation voltages of the various units. In the embodiment, the power supply unit 100 generates a voltage with a value approximately equal to 12V to the processing unit 11 to serve as its operation voltage Vop, and the processing unit 11 performs a processing operation according to the operation voltage Vop. The power supply unit 100 also generates a standby voltage Vsb with a value approximately equal to 3.3V to the processing unit 11, the reset unit 101, and the power control unit 102. In the embodiment, the processing system 1 may be an audio playing system, or a video playing system, and the processing unit 11 may process an audio signal processing operation and/or an image signal processing operation.

Moreover, the power supply unit 100 is capable of determining whether the supplied voltage Vac is being provided to generate a determination signal Sdet. The power supply unit 100 determining that the supplied voltage Vac is being provided means that the power control device 10 is coupled to the external voltage supply source AC and the external voltage supply source AC normally provides the supplied voltage Vac. The power supply unit 100 determining that the supplied voltage Vac is not being provided means that the power control device 10 is not coupled to the external voltage supply source AC or that the power control device 10 is coupled to the external voltage supply source AC but the external voltage supply source AC does not normally provide the supplied voltage Vac. In the case when the power supply unit 100 determines that the supplied voltage Vac is not being provided, the power control device 10 may be coupled to the external voltage supply source AC, and, however, the voltage provided by the external voltage supply source AC is not the normal supplied voltage Vac due to unstable power of the external voltage supply source AC.

Referring to FIG. 1, the reset unit 101 receives the determination signal Sdet and the standby voltage Vsb and generates a reset signal Sreset according to the determination signal Sdet and the standby voltage Vsb to control the processing unit 11 to perform or not perform a reset operation. In other words, the reset signal Sreset is used to activate or inactivate the reset operation. The power control unit 102 receives the reset signal Sreset and generates a power enabling signal Spe according to the reset signal Sreset to the power supply unit 100, so that the power supply unit 100 outputs the operation voltage Vop or does not output the operation voltage Vop according to the power enabling signal Spe.

In the following, the detailed operations of the power control device 10 and the processing unit 11 will be described.

When the power supply unit 100 determines that the supplied voltage Vac is being provided, the power supply unit 100 outputs the standby voltage Vsb to the processing unit 11 and the reset unit 101. The power supply unit 100 switches the determination signal Sdet to an enabled state according to the determination result. In the embodiment, the determination signal Sdet with the enabled state is at a high voltage level. The reset unit 101 switches the reset signal Sreset to a disabled state according to the determination signal Sdet with the enabled state and the standby voltage Vsb. The reset signal Sreset with the disabled state is used to control the processing unit 11 to not perform the reset operation. In the embodiment, the reset signal Sreset with the disabled state is at a high voltage level. The power control unit 102 switches the power enabling signal Spe to an enabled state according to the reset signal Sreset with the disabled state. In the embodiment, the power enabling signal Spe with the enabled state is at a high voltage level. The power supply unit 100 outputs the operation voltage Vop which is generated according to the supplied voltage Vac to the processing unit 11. Since the processing unit 11 also receives the determination signal Sdet, the processing unit 11 realizes that the processing unit 11 will be booted up according to the determination signal Sdet with the enabled state. After the power supply unit 100 outputs the operation voltage Vop, the processing unit 11 performs a booting-up initialization operation.

Figure 2:
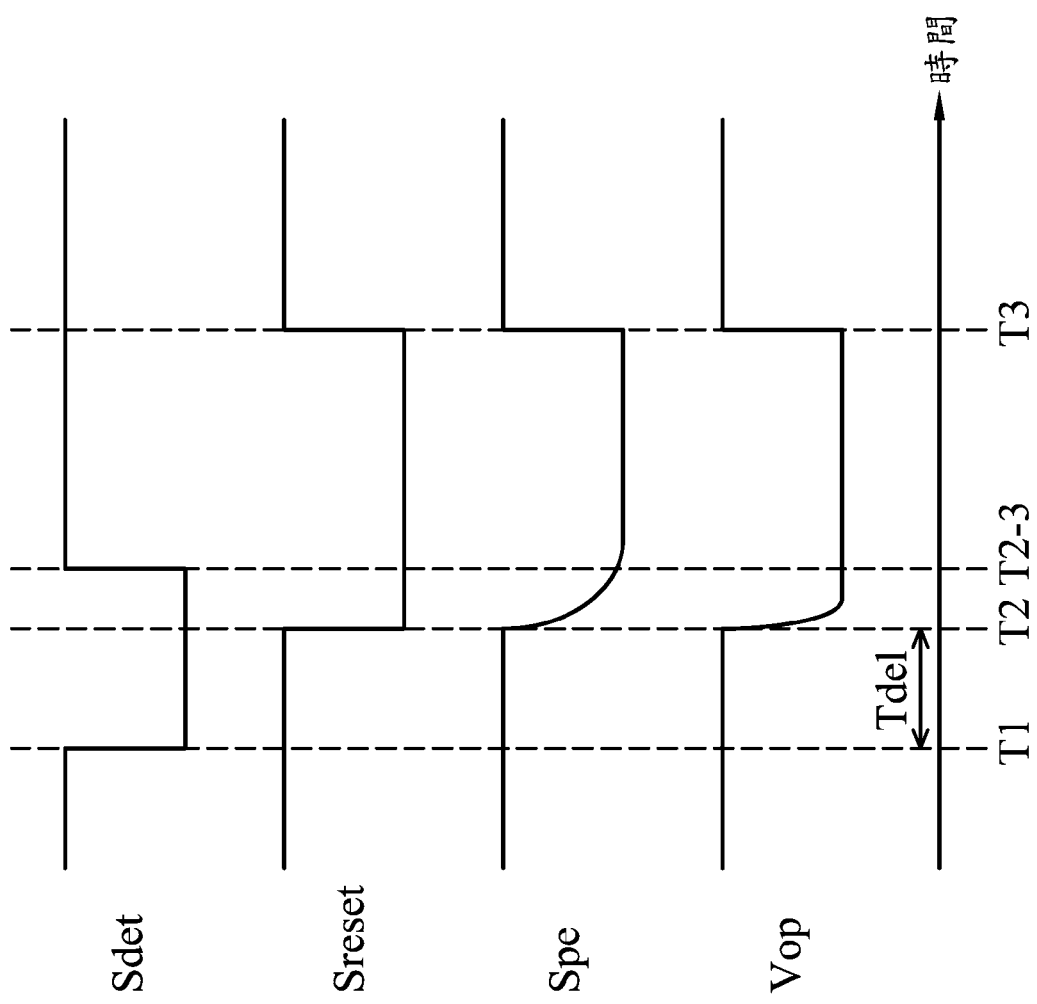
FIG. 2 is a timing chart of main signals of the processing system in FIG. 1.

Referring to FIGS. 1 and 2, when the power supply unit 100 determines that the supplied voltage Vac is not being provided, the power supply unit 100 switches the determination signal Sdet to a disabled state from the enabled state at a time point T1. In the embodiment, the determination signal Sdet with the disabled state is at a low voltage level. The reset unit 101 provides a delay time Tdel. According to the determination signal Sdet with the disabled state and the standby voltage Vsb, the reset unit 101 switches the reset signal Sreset to an enable state from the disable state at a time point T2, which is later than the time point T1 by the delay time Tdel, to control the processing unit 11 to perform the reset operation. In the embodiment, the reset signal Sreset with the enabled state is at a low voltage level. During the time period between the time points T1 and T2, the processing unit 11 stores system state data of the processing system 1 (including system parameters, power information etc.) into the memory 12 according to the determination signal Sdet with the disabled state. Since the reset unit 101 provides the delay time Tdel, it is ensured that the processing unit 11 can finish the data storage operation. At the time point T2, the power control unit 102 switches the power enabling signal Spe to a disabled state according to the reset signal Sreset with the enabled state. In the embodiment, the power enabling signal Spe with the disabled state is at a low voltage level. The power supply unit 100 stops outputting the operation voltage Vop to the processing unit 11 according to the power enabling signal Spe with the disabled state. In FIG. 2, the timing of the operation voltage Vop can show whether the power supply unit 100 is providing the operation voltage Vop. The operation voltage Vop being at a high voltage level represents that the power supply unit 100 outputs the operation voltage Vop, while the operation voltage Vop being at a low voltage level represents that the power supply unit 100 is not outputting the operation voltage Vop.

According to the above description, at the time point T2, the processing unit 11 starts to perform the reset operation according to the reset signal Sreset with the enabled state until a time point T3. In the embodiment, the time period between the time points T2 and T3 (that is the time period when the reset signal Sreset is at the low voltage level) may be predetermined, i.e. 140 ms, according to the specification of the reset unit 101.

According to the embodiment of the present invention, the power control unit 102 controls the state of the power enabling signal Spe according to the reset signal Sreset. Thus, when the power supply unit 100 determines that the supplied voltage Vac is being provided again and switches the determination signal Sdet to the enabling state from the disabled state at a time point during the time period between the time points T1 and T3 (for example, a time point T2-3), the power control unit 102 does not follow the providing of the supplied voltage Vac to immediately switch the power enabling signal Spe to the enable state. In other words, when the supplied voltage Vac is being provided again at a time point during the time period between the time points T1 and T3 (for example, the time point T2-3), the power supply unit 100 does not immediately output the operation voltage Vop to the processing unit 11. The processing unit 11 can finish the data storage operation and the reset operation. Thus, in the situation when quick switching between the supplied voltage Vac is being provided and the supplied voltage Vac occurring, the power supply unit 100 can re-provide the operation voltage Vop, and the processing system can perform a booting-up initialization operation correctly.

Figure 3:
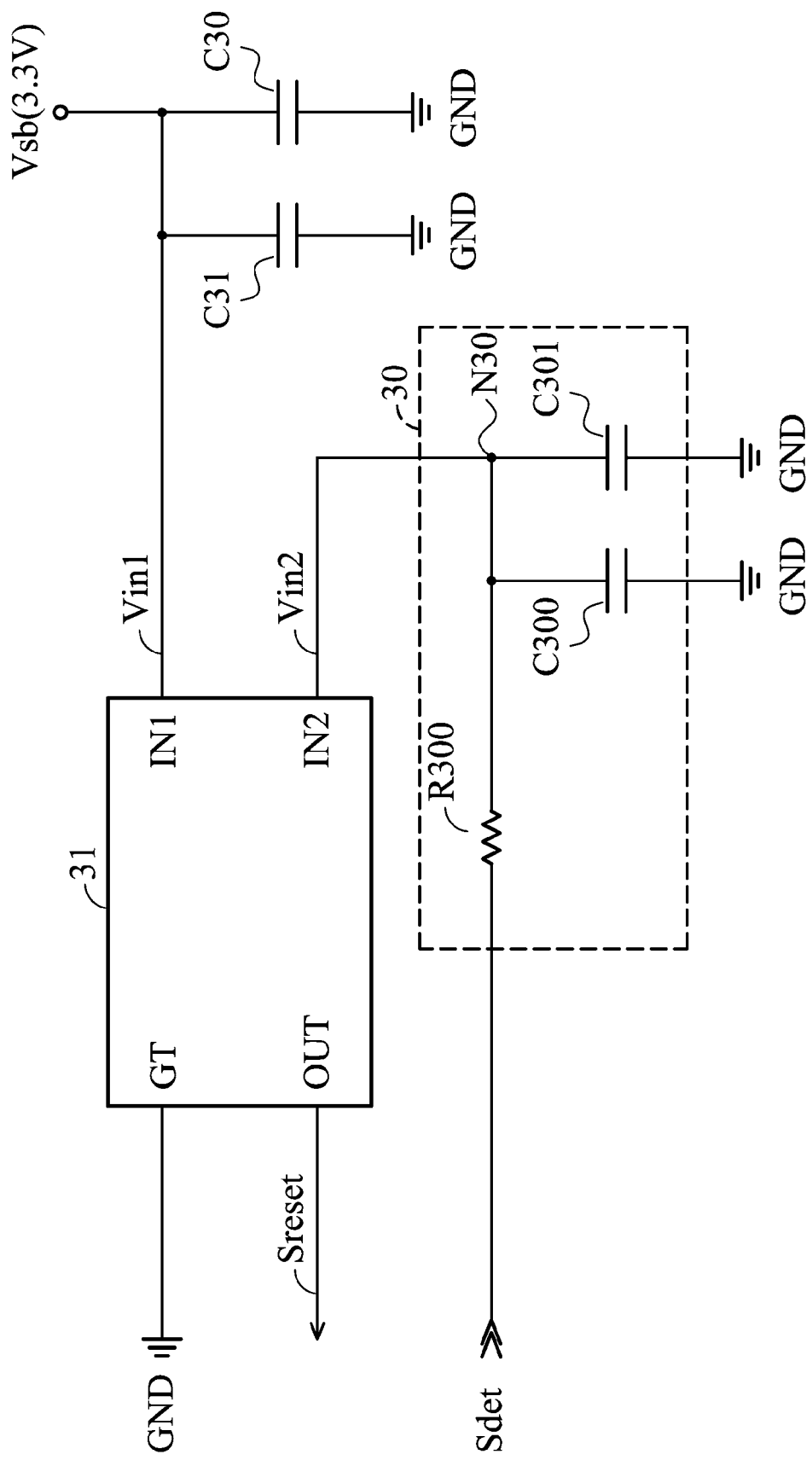
FIG. 3 shows an exemplary embodiment of a reset unit of the processing system in FIG. 1.

FIG. 3 shows an exemplary embodiment of the reset unit 101. Referring to FIG. 3, the reset unit 101 includes a delay circuit 30 and a controller 31. The delay circuit 30 receives the determination signal Sdet and determines the delay time Tdel according to the determination signal Sdet. An input terminal IN1 of the controller 31 receives the standby voltage Vsb, an input terminal IN2 thereof is coupled to the delay circuit 30 at a node N30, and an output terminal OUT generates the reset signal Sreset. The controller 31 further includes a ground terminal GT coupled to a reference ground GND. The reset unit 101 further includes capacitors C30 and C31. The capacitors C30 and C31 are coupled in parallel between the input terminal IN1 and the reference ground GND.

Referring to FIG. 3, the delay circuit 30 includes a resistor R300 and two capacitors C300 and C301. A first terminal of the resistor R30 receives the determination signal Sdet, and a second terminal thereof is coupled to the node N30. The capacitor C300 is coupled between the node N30 and the reference ground GND. The capacitor C301 is coupled between the node N30 and the reference ground GND. The delay time Tdel is determined by the resistance of the resistor R300, the capacitance of the capacitor C300, and the capacitance of the capacitor C301. In the embodiment, the delay time Tdel is approximately equal to 40 ms.

As the above description, when the power supply unit 100 determines that the supplied voltage Vac is being provided, the power supply unit 100 outputs the standby voltage Vsb to the reset unit 101, and the determination signal Sdet has the enabled state (high voltage level). The value of the standby Vsb is higher than a threshold value (i.e. approximately equal 2.93V) which is predetermined by the controller 31. Thus, the voltage Vin1 at the input terminal IN1 is higher than the threshold value. The determination signal Sdet with the high voltage level charges the capacitors C300 and C301 through the resistor R301, so that the voltage Vin2 at the input terminal IN2 has a high voltage level. The controller 31 generates the reset signal Sreset with the disabled state according to the voltage Vin1 higher than the threshold value and the voltage Vin2 with the high voltage level.

When the power supply unit 100 determines that the supplied voltage Vac is not being provided, the determination signal Sdet is switched to the disabled state (low voltage level). At this time, as the supplied voltage Vac is not being provided, the value of the standby value Vsb drops, and the voltage Vin1 at the input terminal IN1 drops from the value of the standby value Vsb. Moreover, since the determination signal Sdet is at the low voltage level, the voltage Vin2 at the input terminal IN2 drops due to the discharging of the capacitors C300 and C301. When the voltage Vin1 drops to be lower than the threshold value and the voltage Vin2 drops to be at a low voltage level, the controller 31 switches the reset signal Sreset to the enabled state from the disabled state. Referring to FIGS. 2 and 3, the time period between the time point (T1) when the determination signal Sdet is switched to the disabled state and the time point (T2) when the reset signal Sreset is switched to the enabled state is the delay time Tdel. As described above, due to the delay time Tdel provided by the delay circuit 30, there is more sufficient time for the processing unit 11 to store system state data (including system parameters, power information etc.) into the memory 12 when the power supply unit 100 determines that the supplied voltage Vac is not being provided.

Figure 4:
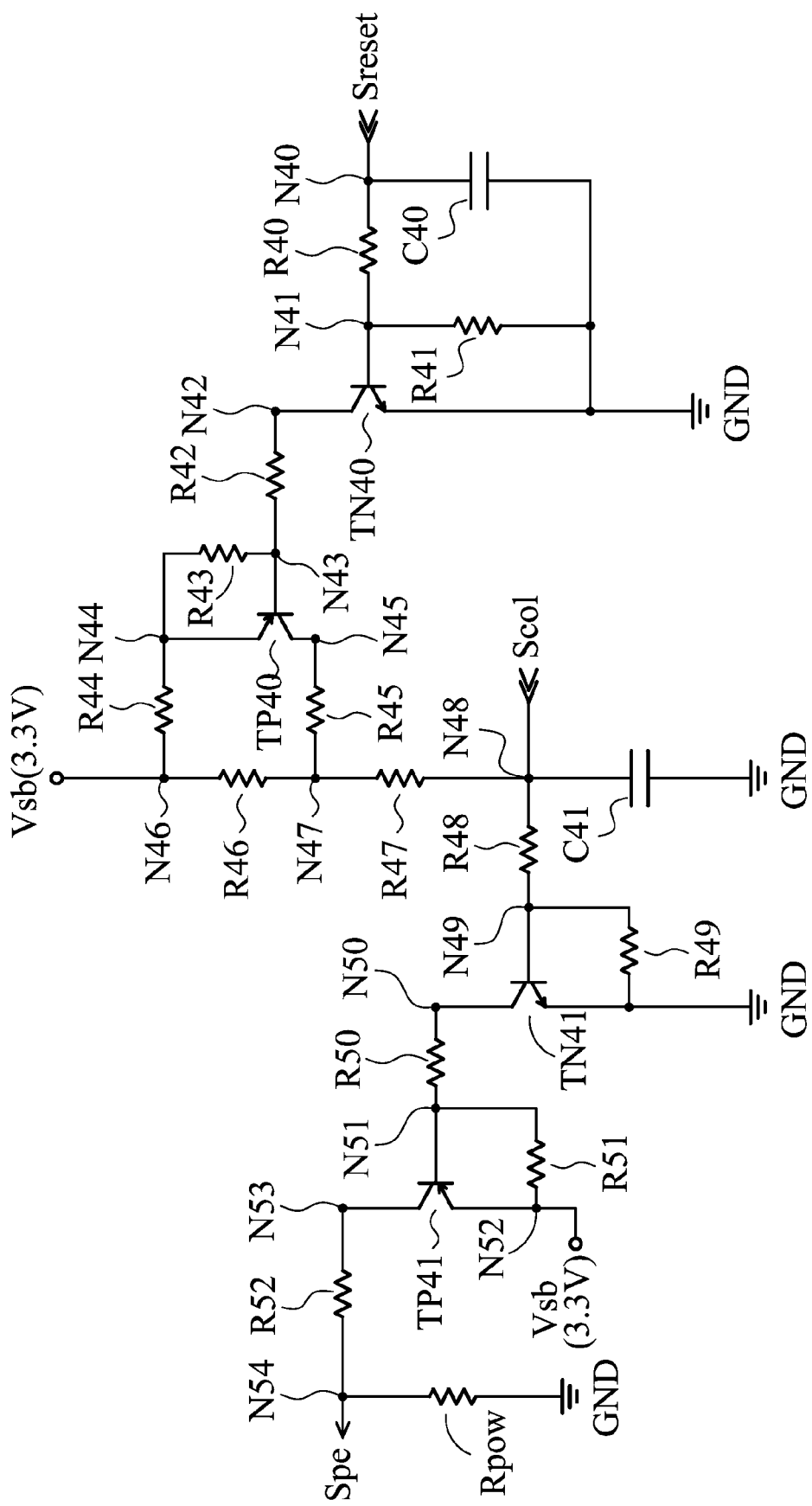
FIG. 4 shows an exemplary embodiment of a power control unit of the processing system in FIG. 1.

FIG. 4 shows an exemplary embodiment of the power control unit 102. The power control unit 102 includes resistors R40~R52, capacitors C40 and C41, transistors TN40 and TN41, and transistors TP40 and TP41. In the embodiment, the transistors TN40 and TN41 are implemented by NPN bipolar junction transistors and, thus, each has a base, a collector, and an emitter. The transistors TP40 and TP41 are implemented by PNP bipolar junction transistors and, thus, each has a base, a collector, and an emitter. Referring to FIG. 4, the power control unit 102 receives the reset signal Sreset through a node N40. The resistor R40 is coupled between the node N40 and a node N41. The capacitor C40 is coupled between the node N40 and the reference ground GND. The resistor R41 is coupled the node N41 and the reference ground GND. The base of the transistor TN40 is coupled to the node N41, the emitter thereof is coupled to the reference ground GND, and the collector thereof is coupled to a node N42. The resistor R42 is coupled between the node N42 and a node N43. The resistor R42 is coupled between the node N42 and a node N43. The base of the transistor TP40 is coupled to the node N43, the emitter thereof is coupled to the node N44, and the collector thereof is coupled to a node N45. The resistor R44 is coupled between the node N44 and a node N46. The power control unit 102 receives the standby voltage Vsb through the node N46. The resistor R45 is coupled between the node N45 and a node N47. The resistor R46 is coupled between the nodes N46 and N47.

The resistor R47 is coupled between the node N47 and a node N48. The capacitor C41 is coupled between the node N48 and the reference ground GND. The resistor R48 is coupled between the node N48 and a node N49. The resistor R49 is coupled between the node N49 and the reference ground GND. The base of the transistor TN41 is coupled to the node N49, the emitter thereof is coupled to the reference ground GND, and the collector thereof is coupled to a node N50. The resistor R50 is coupled between the node N50 and a node N51. The resistor R51 is coupled between the node N51 and a node N52. The base of the transistor TP41 is coupled to the node N51, the emitter thereof is coupled to the node N52, and the collector thereof is coupled to a node N53. The resistor R52 is coupled between the node N53 and a node N54. The power control unit 102 generates the power enabling signal Spe through the node N54.

When the power supply unit 100 determines that the supplied voltage Vac is being provided, the power supply unit 100 outputs the standby voltage Vsb to the voltage control unit 102, and the controller 31 of the reset unit 101 generates the reset signal Sreset with the disabled state (high voltage level). At this time, the transistor TN40 is turned on, so that the node N43 is at a low voltage level to turn on the transistor TP40. Since the node N49 is at a high voltage level, the transistor TN41 is turned on, so that the node N51 is at the low voltage level to turn on the transistor TP41. Thus, the node N54 is at the high voltage level through the turned-on transistor TP41 and the standby voltage Vsb, so that the power control unit 102 generates the power enabling signal Spe with the high voltage level (enabling state) at the node N54. The power supply unit 100 outputs the operation voltage Vop to the processing unit 11 according to the power enabling signal Spe with the enabled state.

When the power supply unit 100 determines that the supplied voltage Vac is not being provided, the controller 31 of the reset unit 101 generates the reset signal Sreset with the enabled state (low voltage level). At this time, the transistor TN40 is turned off, so that the node N43 is at the high voltage level to turn off the transistor TP40. Since the node N49 is at the low voltage level, the transistor TN41 is turned off, so that the node N51 is at the high voltage level to turn off the transistor TP41. Thus, the node N54 is coupled to a reference ground GNDP through a resistor Rp to be at the low voltage level, so that the power control unit 102 generates the power enabling signal Spe with the low voltage level (disabling state). The power supply unit 100 stops outputting the operation voltage Vop to the processing unit 11 according to the power enabling signal Spe with the disabled state. In the embodiment, the resistor Rp is arranged in the power control unit 102 or in the power supply unit 100. Moreover, the reference ground GNDP is the ground of the power circuit board.

Referring to FIGS. 1 and 4, the power control unit 102 is further coupled to the processing unit 11 through the node N48 to receive a control signal Scol. When the power supply unit 100 determines that the supplied voltage Vac is being provided and the processing system 1 is at a standby mode, the processing unit 11 switches the control signal Scol to a disabled state. In the embodiment, the control signal Scol with the disabled state is at a low voltage level. At this time, the node N48 is at a low voltage level, so that the transistor TN41 is turned off, and the node N51 is at the high voltage level to turn off the transistor TP41. Thus, the node N54 is coupled to the reference ground GNDP through the resistor Rp to be at the low voltage level, so that the power control unit 102 generates the power enabling signal Spe with the low voltage level (disabling state). The power supply unit 100 stops outputting the operation voltage Vop to the processing unit 11 according to the power enabling signal Spe with the disabled state.

When the processing system 1 returns to a normal operation mode, the processing unit 11 switches the control signal Scol to an enabled state. In the embodiment, the control signal Scol with the enabled state is at a high voltage level. At this time, the node N48 is at the high voltage level, so that the transistor TN41 is turned on, and the node N51 is at the low voltage level to turn on the transistor TP41. Thus, the node N54 is at the high voltage level through the turned-on transistor TP41 and the standby voltage Vsb, so that the power control unit 102 generates the power enabling signal Spe with the high voltage level (enabling state) at the node N54. The power supply unit 100 outputs the operation voltage Vop to the processing unit 11 according to the power enabling signal Spe with the enabled state.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power control device comprising:
   a power supply unit for determining whether a supplied voltage from an external voltage supply source is being provided to the power supply unit to generate a determination signal, and for generating an operation voltage and a standby voltage according to the supplied voltage;
   a reset unit for receiving the determination signal and the standby voltage, and for generating a reset signal according to the determination signal and the standby voltage to activate a reset operation; and
   a power control unit for receiving the reset signal and for generating a power enabling signal according to the reset signal,
   wherein the power supply unit outputs the operation voltage or does not according to the power enabling signal,
   wherein when the power supply unit determines that the supplied voltage is not being provided to the power supply unit, the power supply unit switches the determination signal to a disabled state from an enabled state at a time point,
   wherein, according to the determination signal with the disabled state and the standby voltage, the reset unit switches the reset signal to an enabled state from a disabled state at a second time point, which is later than the first time point, to activate the reset operation,
   wherein when the power supply unit determines that the supplied voltage is not being provided to the power supply unit, the reset unit switches the reset signal to the enabled state at the second time point, and the reset signal remains at the enabled state during a time period between the second time point and a third time point, wherein the third time point is later than the second time point; and
   wherein when the power supply unit determines that the supplied voltage is being provided to the power supply unit again, the power supply voltage switches the determination signal to the enabled state from the disabled state at a fourth time point which is between the first time point and the third time point, and the reset unit switches the reset signal to the disabled state from the enabled state at the third time point to inactivate the reset operation.

2. The power control device as claimed in claim 1, wherein the reset unit comprises:
   a delay circuit for determining a delay time between the first time point and the second time point according to the determination signal; and
   a controller having a first input terminal for receiving the standby voltage, a second input terminal being coupled to the delay circuit at a first node, and an output terminal for generating the reset signal;
   wherein when the power supply unit determines that the supplied voltage is not being provided to the power supply unit at the first time point, the controller switches the reset signal to the enabled state from the disabled state at the second time point according to the delay time.

3. The power control device as claimed in claim 2, wherein the delay circuit comprises:
   a resistor having a first terminal for receiving the determination signal and a second terminal being coupled to the first node;
   a first capacitor coupled between the first node and a reference ground; and
   a second capacitor coupled between the first node and the reference ground,
   wherein the delay time is determined by resistance of the resistor, capacitance of the first capacitor, and capacitance of the second capacitor.

4. The power control device as claimed in claim 1, wherein the power control unit switches the power enabling signal to a disabled state from an enabled state at the second time point according to the reset signal, and the power supply unit does not output the operation voltage according to the power enabling signal with the disabled state.

5. The power control device as claimed in claim 1, wherein the power control unit switches the power enabling signal to an enabled state from a disabled state at the third time point according to the reset signal, and the power supply unit outputs the operation voltage according to the power enabling signal with the enabled state.

6. The power control device as claimed in claim 1, wherein the reset unit predetermines a time period between the second time point and the third time point.

7. A processing system comprising:
a processing unit for performing a signal processing operation;
a power supply unit for determining whether a supplied voltage from an external voltage supply source is being provided to the power supply unit to generate a determination signal, and for generating an operation voltage and a standby voltage according to the supplied voltage;
a reset unit for receiving the determination signal and the standby voltage, and for generating a reset signal according to the determination signal and the standby voltage to control the processing unit to perform a reset operation; and
a power control unit for receiving the reset signal and for generating a power enabling signal according to the reset signal;
wherein the power supply unit outputs the operation voltage to the processing unit or does not according to the power enabling signal,
wherein when the power supply unit determines that the supplied voltage is not being provided to the power supply unit, the power supply unit switches the determination signal to a disabled state from an enabled state at a time point; and
wherein, according to the determination signal with the disabled state and the standby voltage, the reset unit switches the reset signal to an enabled state from a disabled state at a second time point, which is later than the first time point, to control the processing unit to perform the reset operation,
wherein when the power supply unit determines that the supplied voltage is not being provided to the power supply unit, the reset unit switches the reset signal to the enabled state at the second time point, and the reset signal remains at the enabled state during a time period between the second time point and a third time point, wherein the third time point is later than the second time point; and
wherein when the power supply unit determines that the supplied voltage is being provided to the power supply unit again, the power supply voltage switches the determination signal to the enabled state from the disabled state at a fourth time point which is between the first time point and the third time point, and the reset unit switches the reset signal to the disabled state from the enabled state at the third time point to control the processing unit to stop performing the reset operation.

8. The processing system as claimed in claim 7, wherein between the first time point and the second time point, the processing unit stores system state data into a memory according to the determination signal with the disabled state.

9. The processing system as claimed in claim 8, wherein after the third time point, the processing unit performs a booting-up initialization operation and then performs the signal processing operation.

10. The processing system as claimed in claim 8, wherein the power control unit switches the power enabling signal to an enabled state from a disabled state at the third time point according to the reset signal, and the power supply unit outputs the operation voltage to the processing unit according to the power enabling signal with the enabled state.

11. The processing system as claimed in claim 8, wherein the reset unit predetermines a time period between the second time point and the third time point.

12. The processing system as claimed in claim 7, wherein the reset unit comprises:
a delay circuit for determining a delay time between the first time point and the second time point according to the determination signal; and
a controller having a first input terminal receiving the standby voltage, a second input terminal coupled to the delay circuit at a first node, and an output terminal generating the reset signal,
wherein when the power supply unit determines that the supplied voltage is not being provided to the power supply unit at the first time point, the controller switches the reset signal to the enabled state from the disabled state at the second time point according to the delay time.

13. The processing system as claimed in claim 12, wherein the delay circuit comprises:
a resistor having a first terminal receiving the determination signal and a second terminal coupled to the first node;
a first capacitor coupled between the first node and a reference ground; and
a second capacitor coupled between the first node and the reference ground,
wherein the delay time is determined by resistance of the resistor, capacitance of the first capacitor, and capacitance of the second capacitor.

14. The processing system as claimed in claim 7, wherein the power control unit switches the power enabling signal to a disabled state from an enabled state at the second time point according to the reset signal, and the power supply unit does not output the operation voltage to the processing unit according to the power enabling signal with the disabled state.

* * * * *